United States Patent
Agrawal (10) Patent No.: US 9,842,043 B2
(45) Date of Patent: Dec. 12, 2017

(54) SYSTEM AND METHOD TO IMPLEMENT AN ELECTRONIC DOCUMENT BASED AUTOMATED TESTING OF A SOFTWARE APPLICATION

(71) Applicant: Hariprakash Agrawal, Bangalore (IN)

(72) Inventor: Hariprakash Agrawal, Bangalore (IN)

( * ) Notice: Subject to any disclaimer, the term of this patent is extended or adjusted under 35 U.S.C. 154(b) by 128 days.

(21) Appl. No.: 14/623,746

(22) Filed: Feb. 17, 2015

(65) Prior Publication Data

US 2015/0234734 A1 Aug. 20, 2015

(30) Foreign Application Priority Data

Feb. 18, 2014 (IN) .............................. 755/CHE/2014

(51) Int. Cl.
*G06F 11/00* (2006.01)
*G06F 11/36* (2006.01)

(52) U.S. Cl.
CPC ...... *G06F 11/3688* (2013.01); *G06F 11/3664* (2013.01); *G06F 11/3692* (2013.01)

(58) Field of Classification Search
CPC ............. G06F 11/3684; G06F 11/3688; G06F 11/3692
USPC ....................................................... 714/38.1
See application file for complete search history.

(56) References Cited

U.S. PATENT DOCUMENTS

| 7,392,507 | B2 * | 6/2008 | Kolawa | G06F 11/3624 714/E11.209 |
|---|---|---|---|---|
| 7,873,944 | B2 * | 1/2011 | Bangel | G06F 11/3664 717/124 |
| 8,296,734 | B2 * | 10/2012 | Geppert | G06F 11/3676 717/101 |
| 2007/0279701 | A1 * | 12/2007 | Hsu | G06F 8/30 358/403 |
| 2008/0221861 | A1 * | 9/2008 | Yoneda | G06F 17/5022 703/26 |

\* cited by examiner

*Primary Examiner* — Elmira Mehrmanesh
(74) *Attorney, Agent, or Firm* — The Law Office of Austin Bonderer, PC; Austin Bonderer (57) ABSTRACT

A system for testing a software application includes (a) a memory unit includes a database and a set of modules; and (b) a processor that executes the set of modules. The set of modules include (i) a test case module that processes an input received from a user through a first user interface view of an electronic document; (ii) a test action module that processes an input includes (a) keywords in a second user interface view of the electronic document, and (b) unique identification number for each of the one or more test action, (iii) a test case execution module that executes the test case by executing the one or more action item; (iv) a comparison module that compare the obtained test case execution result with a predetermined result; and (v) a validation module that validate the software application based on the comparison.

13 Claims, 7 Drawing Sheets

| StepNo | Test Steps | Locators | Locators Value | Browsers | TestData | | |
|---|---|---|---|---|---|---|---|
| 1 | Initialize Browser Instance and browse application url | Xpath | Http://demo.testfire.net/login.aspx | GHOST | | | |
| 2 | Enter valid "Username" in text field | Xpath | //*[@id='uid'] | | jsmith | | |
| 3 | Enter valid "Password" in text field | Xpath | //*[@id='passw'] | | demo123 | | |
| 4 | Click login button | Xpath | //*[@id='login']/table/tbody/tr[3]/td[2]/input | | | | |
| 5 | Match Welcome Message | Xpath | //*[@id='wrapper']/table/tbody/tr[2]/td[2]/div/h1 | | True | | |
| 6 | Click on "GO" button for checking account details | Xpath | //*[@id='btnGetAccount'] | | | | |
| 7 | Match account number | Xpath | //*[@id='_ctl0__ctl0_content_mainaccountid'] | | | | |

SYSTEM AND METHOD TO IMPLEMENT AN ELECTRONIC DOCUMENT BASED AUTOMATED TESTING OF A SOFTWARE APPLICATION

CROSS-REFERENCE TO RELATED APPLICATIONS

This application claims priority to Indian patent application no. 755/CHE/2014 filed on Feb. 18, 2014 the complete disclosure of which, in its entirely, is herein incorporated by reference.

BACKGROUND

Technical Field

The embodiments herein generally relate to testing a software application, and, more particularly, system and method to implement an electronic document based automated testing of a software application.

Description of the Related Art

Presently large number of tools for web applications, networking based applications, etc are being developed for automation testing. The software applications are being developed by software for creating modules, clauses, data resources etc. Before launching the software applications, the software applications are needed to be tested. Even though test automation engineers are testing the software application, there are some challenges faced while carrying out smooth testing within the specified time frame. Some of the challenges are (a) test automation engineers need to know testing concepts, domain knowledge, and a programming language, which is very difficult to be find in a single test automation engineer, (b) the test automation engineers need to test positive and negative scenarios writing complex code for automation, which may take days if huge test parameters are to be defined, (c) with continuous change in requirements, test automation scripts needs to be modified or tuned accordingly and at times, requirement changes so fast that test automation cannot keep the pace and product release delays due to delays in testing, (d) during maintenance, even for a minor change in application, complete application needs to be tested hence test automation scripts also needs a multiple change which again delays the product release, (e) if test automation resource leaves an organization then it becomes very difficult to train another person and continue test automation for that particular case, and (f) most of the test automation tools are very costly for a small company or individuals for carrying out their test automation work. Because of these challenges, the test automation engineers find it difficult to test the software applications faster and follow the conventional route of coding and testing. Accordingly there remains a need for an efficient tool with better automation for testing the software applications.

SUMMARY

In view of the foregoing, an embodiment herein provides a system for testing a software application includes (a) a memory unit include a database and a set of modules; and (b) a processor that executes the set of modules. The set of modules include (i) a test case module, executed by the processor, that processes an input received from a user through a first user interface view of an electronic document to define test cases that are executed to test the software application; (ii) a test action module, executed by the processor, that processes an input includes (a) keywords in a second user interface view of the electronic document to define at least one test actions, and (b) unique identification number for each of the one or more test action, (iii) a test case execution module, executed by the processor, that executes the test case by executing the one or more action item to obtain a test case execution result; (iv) a comparison module, executed by the processor, that compare the obtained test case execution result with a predetermined result associated with the input received at the first user interface view of the electronic document; and (v) a validation module, executed by the processor, that validate the software application based on the comparison. The each of the test cases is associated with one or more the test actions.

The system may further include a locator module, executed by the processor that searches and matches the at least one test action that corresponds to the test case. The locator module searches and matches the at least one test action that may corresponds to the test case is based on at least one of (i) identifier, (ii) name, (iii) class name, (iv) CSS selector, (v) link text, (vi) partial link text, (vii) tag name. The system may further include a test action fetch module, executed by the processor that fetches at least one action item that corresponds to the test case from the second user interface. The system may further include a predetermined result obtaining module, executed by the processor that obtains the predetermined result associated with the input received at the first user interface view of the electronic document. The predetermined result for the test case may specify a result obtained on implementation under test based on the input. The system may further include a result notification module, executed by the processor that notifies the test case execution result to the user. The test case execution result may include at least one of (i) pass, (ii) fail, (iii) skip, or (iv) block.

In another aspect a processor implemented method for testing a software application is provided. The processor implemented method include (i) processing, an input received from a user through a first user interface view of an electronic document to define test cases that are executed to test the software application, (ii) processing, an input include (i) keywords in a second user interface view of the electronic document to define at least one test action, and (ii) unique identification number for each of the at least one test actions, (iii) executing the test case by executing the at least one action item to obtain a test case execution result, (iv) comparing the obtained test case execution result with a predetermined result associated with the input received at the first user interface view of the electronic document, and (v) validating, the software application based on the comparison. The each of the test cases is associated with at least one the test actions.

The processor implemented method may further include searching and matching, by a locator unit, the at least one test action that corresponds to the test case. The searching and matching the at least one test action that may corresponds to the test case is based on at least one of (i) identifier, (ii) name, (iii) class name, (iv) CSS selector, (v) link text, (vi) partial link text, (vii) tag name. The processor implemented method may further include fetching at least one action item that corresponds to the test case from the second user interface. The processor implemented method may further include the predetermined result associated with the input received at the first user interface view of the electronic document is obtained. The predetermined result for the test case may specify a result obtained on implementation under test based on the input. The processor implemented method may further include notifying the test case execution result to the user. The test case execution result includes at least one of (i) pass, (ii) fail, (iii) skip, or (iv) block.

In yet another aspect, one or more non-transitory computer readable storage mediums storing one or more sequences of instructions, which when executed by one or more processors, causes processing, an input received from a user through a first user interface view of an electronic document to define test cases that are executed to test the software application, processing, an input include (i) keywords in a second user interface view of the electronic document to define at least one test actions, and (ii) unique identification number for each of the at least one test action, fetching, at least one action item that corresponds to the test case from the second user interface, executing the test case by executing the at least one action item to obtain a test case execution result, comparing the obtained test case execution result with a predetermined result associated with the input received at the first user interface view of the electronic document, and validating, the software application based on execution of the test case. The each of the test cases is associated with at least one the test actions.

The one or more non-transitory computer readable storage mediums may further include searching and matching, by a locator unit, the at least one test action that corresponds to the test case. The searching and matching the at least one test action that may corresponds to the test case is based on at least one of (i) identifier, (ii) name, (iii) class name, (iv) CSS selector, (v) link text, (vi) partial link text, (vii) tag name. The one or more non-transitory computer readable storage mediums may further include obtaining the predetermined result associated with the input received at the first user interface view of the electronic document. The predetermined result for the test case specifies a result obtained on implementation under test based on the input. The one or more non-transitory computer readable storage mediums may further include notifying the test case execution result to the user. The test case execution result may include at least one of (i) pass, (ii) fail, (iii) skip, or (iv) block.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an efficient tool with better automation for testing the software applications. The embodiments herein achieve this by providing a test automation tool to implement an electronic document based automated testing of a software application. The test automation tool receives an input received from a user through a first user interface view and a second user interface view of an electronic document to define test cases and corresponding test action respectively that are executed to test the software application. A test case execution result is obtained while the test case is executed by the one or more action item. The software application is validated based on comparison of the obtained test case execution result with a predetermined result associated with the input received at the first user interface view of the electronic document. Referring now to the drawings, and more particularly to FIGS. 1 through 6, where similar reference characters denote corresponding features consistently throughout the figures, there are shown preferred embodiments.

Figure 1:
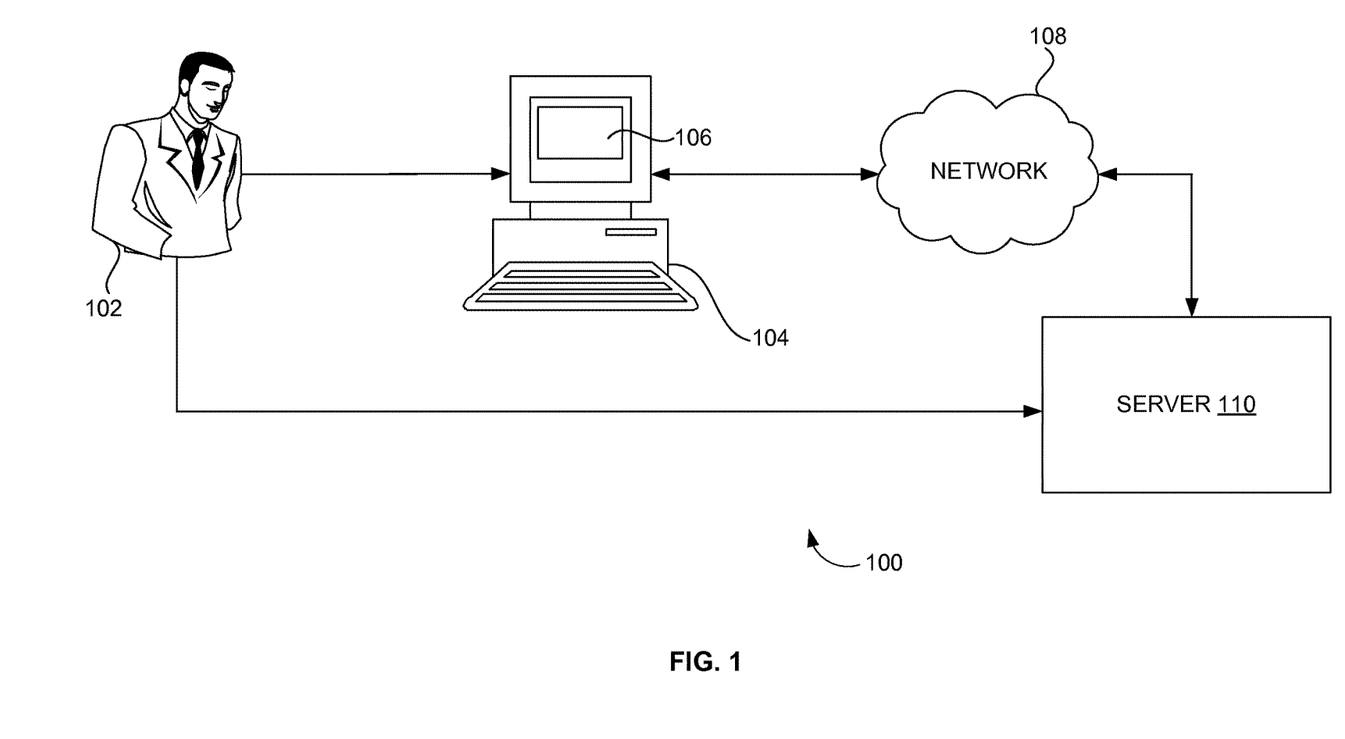
FIG. 1 illustrates a system view of a user interacting with a computing device to test a software application using a test automation tool according to an embodiment herein.

FIG. 1 illustrates a system view 100 of the user 102 interacting with the computing device 104 to test the software application using the test automation tool 106 according to an embodiment herein. The system view 100 includes the user 102, the computing device 104, the test automation tool 106, a network 108, and a server 110. In one embodiment, the user 102 can be a tester, a customer, management, a software developer, business analyst, and an individual with basic understanding of software testing. The test automation tool 106 is implemented on the computing device 104 to implement an electronic document based automated testing of the software application. In one embodiment, the test automation tool is implemented in the server 110. In one embodiment, the network 108 may be an internet, or a broadcast network. In one embodiment, the computing device 104 is a mobile communication device, a smart phone, a tablet PC, a laptop, a personal computer, and an ultra-book. The electronic document may be an electronic media content (e.g., text, graphics, or spreadsheets, data in a tabular form). In one embodiment, the software application can be a web application, but not limited to a mobile application, desktop application, and an embedded application.

The test automation tool 106 enables in automated testing of the software application based on the electronic document. The test automation tool 106 receives an input from the user 102. The input includes one or more test cases in a first interface view of the electronic document (e.g., spreadsheet) to define test cases that are executed to test the software application. The input further includes one or more test actions in a second user interface view of the electronic document (e.g., spreadsheet). The input includes (i) keywords in the second user interface view of the electronic document to define at least one test actions, and (ii) unique identification number for each of the one or more test action. In one embodiment, each of the test cases is associated with the one or more test actions.

For example, a tester writes the one or more test cases in the spreadsheet and corresponding one or more test actions. The test automation tool 106 executes the test case by executing the one or more action item to obtain a test case execution result. The test automation tool 106 compares the obtained test case execution result with a predetermined result associated with the input received at the first user interface view of the electronic document. In one embodiment, the predetermined result defines an expected output for the test cases. The expected result specifies what the implementation under test (IUT) should produce from the test inputs. The test automation tool 106 validates the software application based on the comparison. The test automation tool 106 notifies the user 102 with the test case execution result. The test case execution result may include at least one of (i) pass, (ii) fail, (iii) skip, or (iv) block.

Figure 2:
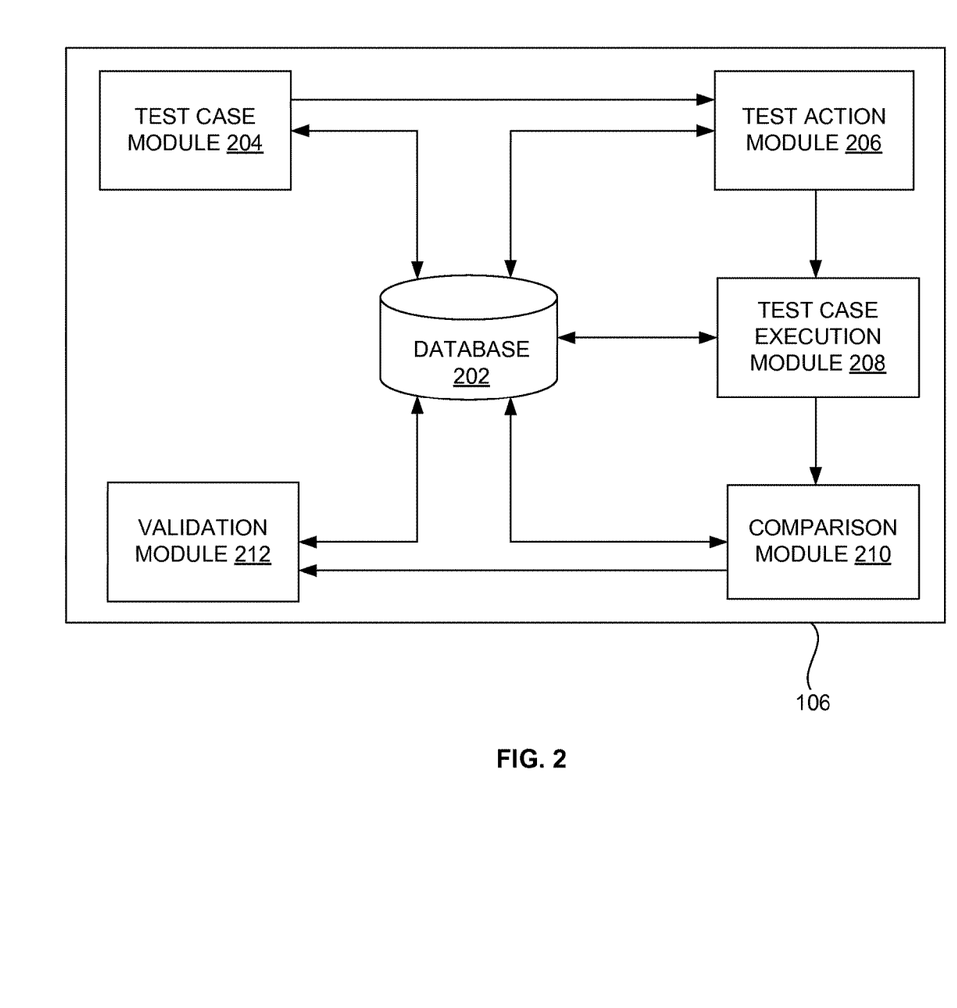
FIG. 2 illustrates an exploded view of the test optimizer tool for testing the software application of FIG. 1 according to an embodiment herein.

FIG. 2 illustrates an exploded view of the test automation tool 106 of FIG. 1 according to an embodiment herein. The test automation tool 106 includes a database 202, a test case module 204, a test action module 206, a test case execution module 208, a comparison module 210, and a validation module 212. The database 202 stores information associated with the test cases and information associated with the one or more test action. The test case module 204 that processes an input received from the user 102 through a first user interface view of the electronic document to define the test cases that are executed to test the software application. The test action module 206 that processes an input includes (i) keywords in the second user interface view of the electronic document to define one or more test actions, and (ii) unique identification number for each of the one or more test action. In one embodiment, each of the test cases is associated with one or more test actions. In one embodiment, the keywords given in the test steps may be enter, click, select, and match.

The test case execution module 208 executes the test case by executing the one or more action item to obtain a test case execution result. The comparison module 210 compares the obtained test case execution result with a predetermined result associated with the input received at the first user interface view of the electronic document. The validation module 212 validates the software application based on the comparison. The test automation tool 106 further includes a locator module that searches and matches the one or more test action that corresponds to the test case. In one embodiment, the locators are a system to find and match elements of the page in the software application that needs to interact.

For example, xpath is used to locate the elements, hence 'xpath' is written in the Locators column of the first interface view. The respective locator may be written in the Locators column of the first interface view when id, name, class Name, cascading style sheet (CSS) selector (e.g., style, layout), link Text, partialLinkText, tag Name. In one embodiment, a Locator Value is a Pattern for the specific locator. For example, if xpath is used as Locator and hence, the Locator value for that is the xpath value as mentioned in the second user interface view. In one embodiment, if ID as the locator, then the locator value may be the ID of that particular element.

The test automation tool 106 further includes a test action fetch module, fetches one or more action item that corresponds to the test case from the second user interface of the electronic document. The test automation tool 106 further includes a predetermined result obtaining module, obtains the predetermined result associated with the input received at the first user interface view. The predetermined result for the test case specifies a result obtained on implementation under test based on the input. The test automation tool 106 further includes a result notification module notifies the test case execution result to the user. The test case execution result includes at least one of (i) pass, (ii) fail, (iii) skip, or (iv) block. For example, the status pass is notified when the predetermined result and the test case execution result of the software application matches. Similarly, if the last step in the testcase throws some error, then the result is notified as Fail. Similarly, If write 'N' or 'No' in the Execute column of the first interface view of the electronic document, for the particular test case then in that case the result is notified as Skip. In one embodiment, if any of the step in the particular test case other than the last step, throws some error, then the result is notified as Block. In one embodiment, the error at the time of the execution is notified to the user 102 with one or more reasons (e.g., result summary). In one embodiment, the test cases and the test action may be modified based on a business application. For example, in banking application, verifying access of correct URL during runtime is provided as one of the test case in a first spreadsheet. In the banking application, an initialized browser instance and browser application URL is provided as a test action in the second spreadsheet (i.e. action sheet). The test cases and the test action providing URL may be created by the user 102 for testing the web application.

Figure 3A:
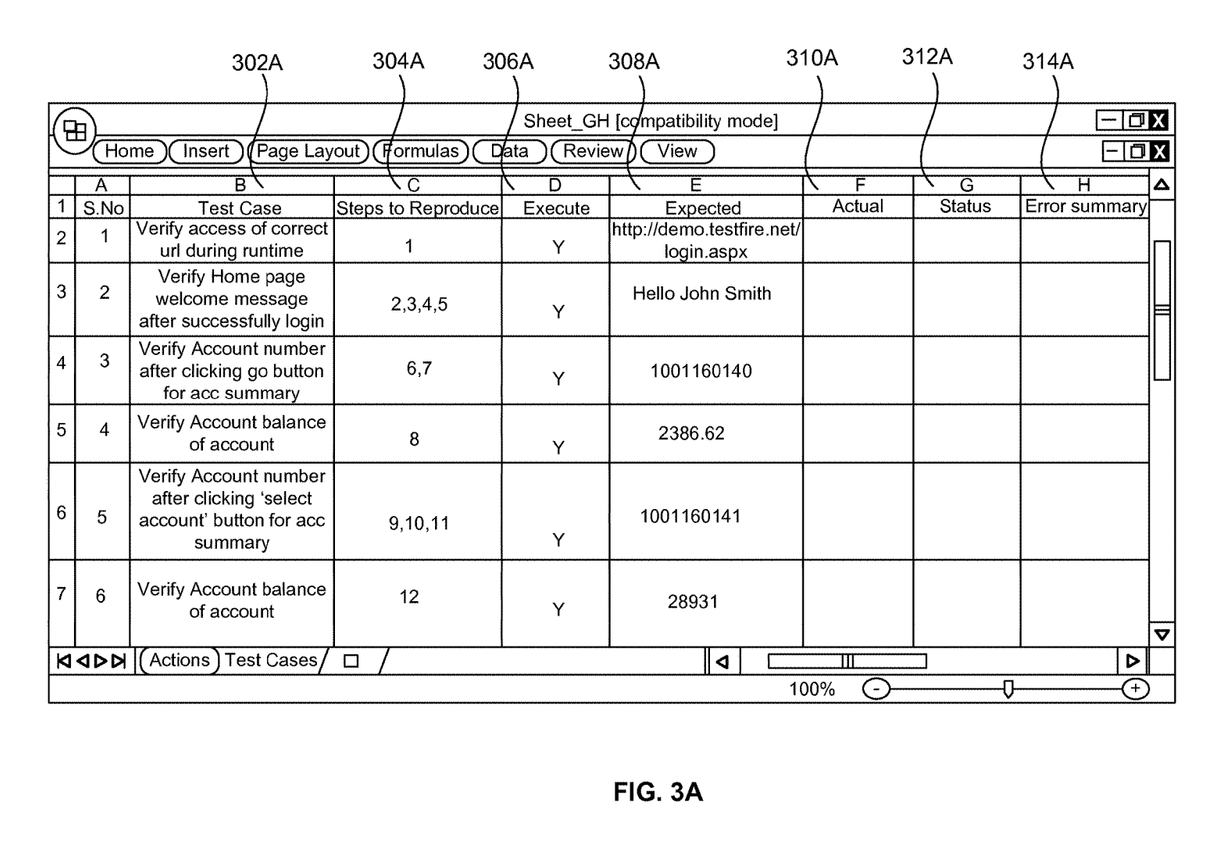
FIG. 3A illustrates an exemplary view of test cases written in the electronic document for testing the software application according to an embodiment herein.

FIG. 3A illustrates an exemplary view of test cases written in the electronic document for testing the software application according to an embodiment herein. In column B 302A, one or more test cases to be performed to check a specific functionality of the web application is provided. For example, in a banking application, "verifying a home page welcome message after successfully login" in the column B 302A is the test case which is written by the user 102 in a human language (e.g., English language). The test automation tool 106 executes the test case "verifying a home page welcome message after successfully login" in an automated way if a tester chooses "Y" in column D 306A and provides results as Hello John Smith in the column E 308A of the same electronic document. The test cases are written in the human language which are executed to test software application. The human language is not a programming language. The first interface view of the electronic document, in which the column C 304A, test action is defined to reproduce the test cases that are necessary to execute the specific test cases. In one embodiment, the test steps may be fetched based on a unique identification number (e.g., alphabets, numeric, alphanumeric) in a specific column from the test actions sheet in the second user interface view of the electronic document. In column D 306A, an option is provided to execute the test case by entering Yes/No. For example, if the tester chooses Y or Yes then test case is executed. If the tester chooses N or No then the particular test case is not executed.

In column E 308A, an expected output for the test case may be defined by the user 102. For example, in banking application, a user name is appeared in a home page welcome message after successfully login. In column F 310A, the test result may reflect the actual value after the execution of the test cases. In column G 312A, a status of an execution is notified to the user 102. The notification associated with a particular test case may be denoted by a PASS or FAIL. For example, the test case with test action to verify access to correct URL during runtime is passes the test parameters, then the notification in the subsequent column will be PASS.

The test automation tool 106 notifies the result of the execution with at least one of (i) PASS if there is match between the predetermined result and the test case execution result, (ii) FAIL if a last step in the test case indicate an error, (iii) SKIP if it is written N (e.g., No) in the execute column for the particular test case, and (iv) BLOCK if any of a step in the particular test case other than a last step, indicate an error. In column H 314A, an error summary which specifies a cause of failure is reported. In one example embodiment, URL verification of the software application may be initially performed before testing through the spreadsheet is carried out.

Figure 3B:
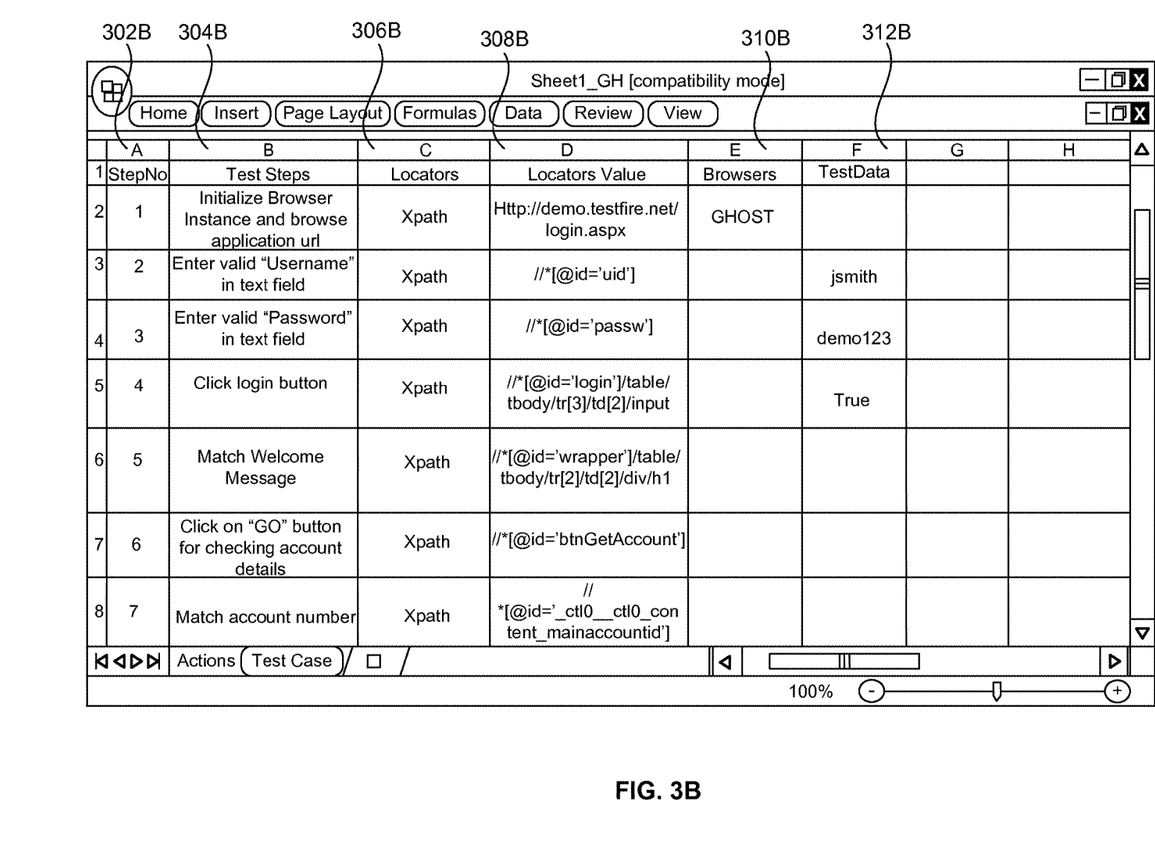
FIG. 3B illustrates an exemplary view of test action written in the electronic document for testing the software application according to an embodiment herein.

FIG. 3B illustrates an exemplary view of test action written in the electronic document for testing the software application according to an embodiment herein. The second user interface view of the electronic document in which the column A 302B, a unique number for identification of a single test action may be assigned. The test action is reproducible for the test cases which may be found in the test action to reproduce in column C 304A in the test cases spreadsheet. For example, in banking application, the test case for verifying a home page's welcome message after successfully login, the test action no. 2, 3, 4, and 5 may be used to reproduce a particular test scenario.

In column B 304B, the test action may be described in the spreadsheet cell that may reflect a specific test case scenario. In column C 306B, a locator may be used to find and match elements of the software application. For example, x-path is used to locate the elements of the software application. The 'x-path' is written in the locator column. A specific software application which the user 102 need to test may require user id, name, class name, CSS selector, link text, partial link text, tag name, etc. Once the attributes of the software application is acquired by the user 102 then the respective locator may be included in column C 306B. In column D 308B, a locator value may be described for a specific locator. For example, if the user 102 acquires the id as the locator, then the locator value may be an id of a specific web element of the software application. The locators give your test script a way to find objects of interest on the page or view. Locators rely on the structure of the page, properties of the target element, or sometimes both.

The locator value may be defined from a firebug, firepath, etc. In column E 310B, a browser may be specified as to which browser the user 102 needs to run the test cases. In one example embodiment, the browser may be such as Internet Explorer, Mozilla Firefox, Netscape, Google Chrome, Safari, but not limited to the embodiments mentioned herein. In column F 312B, a test data is created to produce an expected result. The test data may be created by set of inputs which the user 102 wants to enter while executing a specific test step. The specific test data may be written in column F 312B for the respective test case. In one embodiment, the test data can be obtained from another electronic document. In one embodiment, the test data is applicable for a test box, a test area, and/or dropdown, etc. but not limited to the embodiments mentioned herein.

Figure 4:
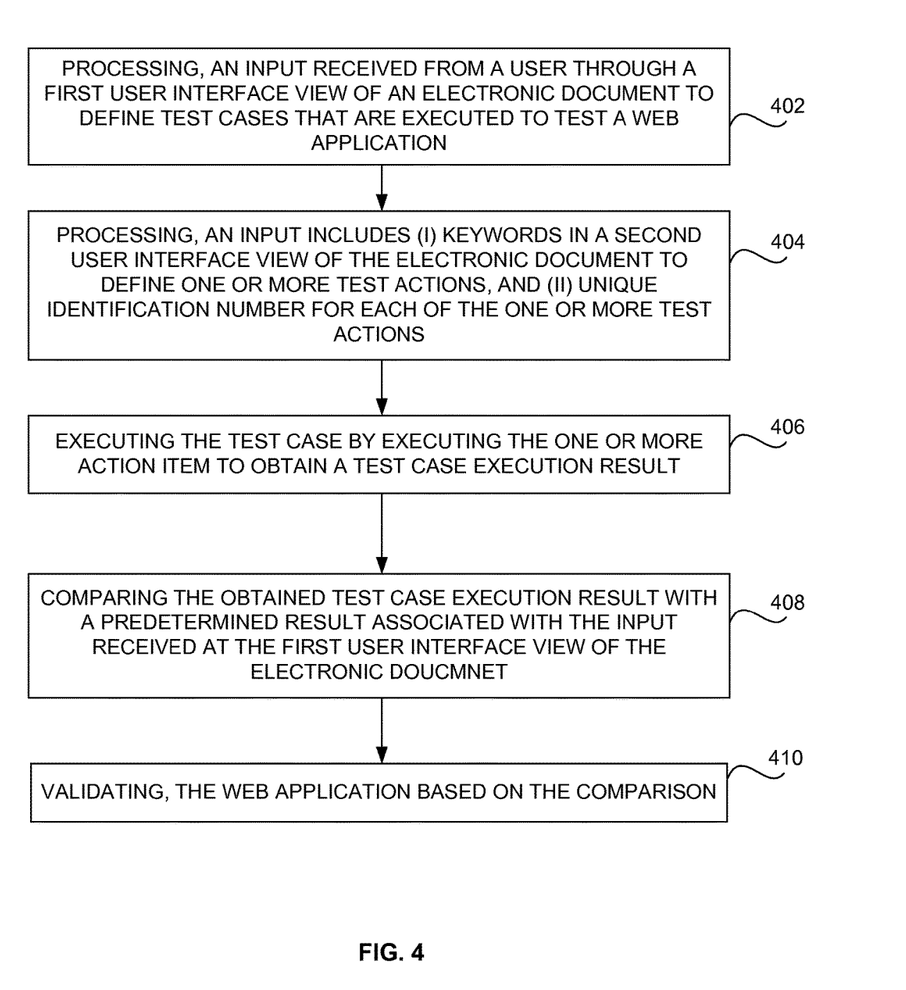
FIG. 4 is a flow diagram illustrating a method of automated testing of the software application based on the electronic document using the test automation tool according to an embodiment herein.

FIG. 4 is a flow diagram illustrating a method of automated testing of the software application based on the electronic document using the test automation tool according to an embodiment herein. In step 402, an input received from the user 102 through a first user interface view of an electronic document is processed to define test cases that are executed to test a software application. In step 404, an input is processed which includes (i) keywords in a second user interface view of the electronic document to define one or more test action, and (ii) unique identification number for each of the one or more test actions. In step 406, the test case is executed by executing the one or more action item to obtain a test case execution result. In step 408, comparing the obtained test case execution result with a predetermined result associated with the input received at the first user interface view of the electronic document. In step 410, the software application is validated based on the comparison.

The method further includes searching and matching, by a locator unit, the one or more test action that corresponds to the test case. The locator may be at least one of (i) identifier, (ii) name, (iii) class name, (iv) CSS selector, (v) link text, (vi) partial link text, (vii) tag name. The method further includes one or more action item that corresponds to the test case may be fetched from the second user interface of the electronic document. The method further include the predetermined result associated with the input received at the first user interface view of the electronic document is obtained. The predetermined result for the test case specifies a result obtained on implementation under test based on the input. The method further include the test case execution result is notified to the user 102. The test case execution result includes the status as at least one of (i) pass, (ii) fail, (iii) skip, or (iv) block.

Figure 5:
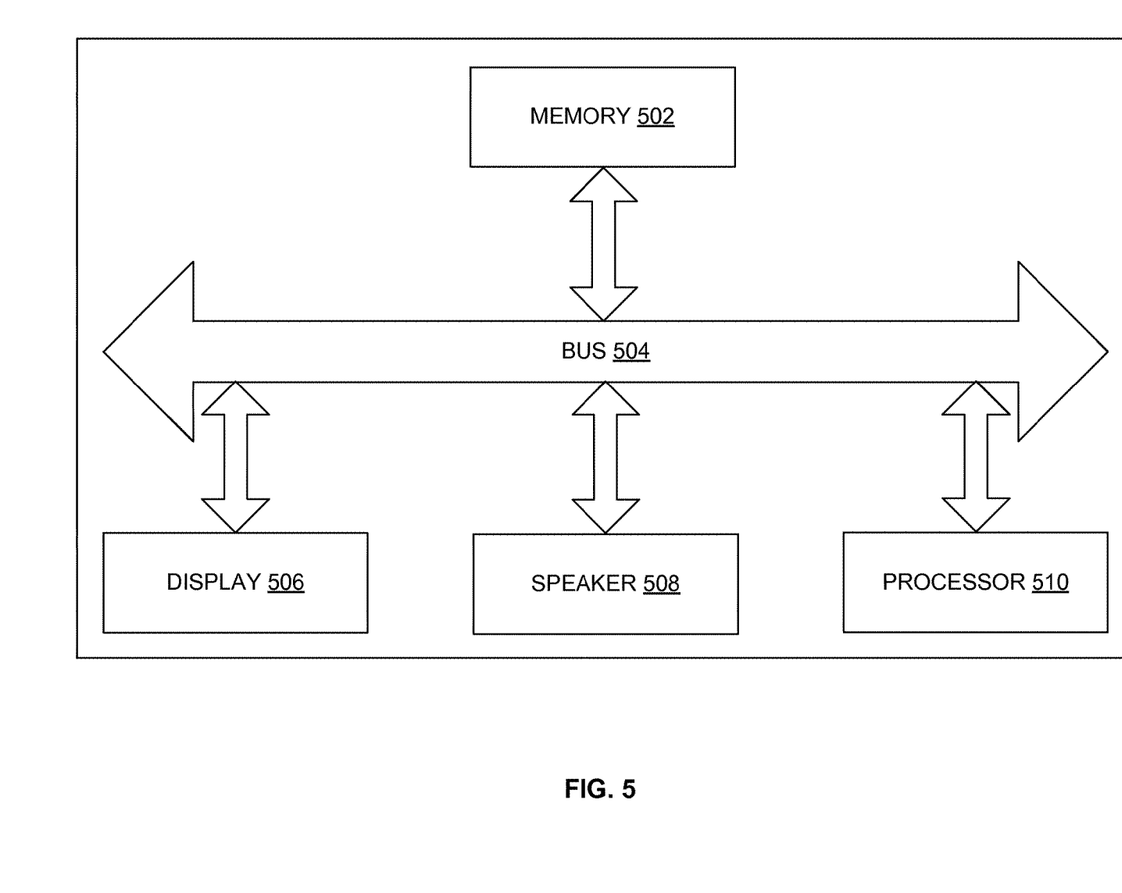
FIG. 5 illustrates an exploded view of the computing device of FIG. 1 according to an embodiment herein.

FIG. 5 illustrates an exploded view of the computing device 104 having an a memory 502 having a set of computer instructions, a bus 504, a display 506, a speaker 508, and a processor 510 capable of processing a set of instructions to perform any one or more of the methodologies herein, according to an embodiment herein. In one embodiment, the receiver may be the computing device 104. The processor 510 may also enable digital content to be consumed in the form of video for output via one or more displays 506 or audio for output via speaker and/or earphones 508. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g., the detected information bits) available in the future or stored from the past. A user of the computing device 104 may view this stored information on display 506 and select an item of for viewing, listening, or other uses via input, which may take the form of keypad, scroll, or other input device(s) or combinations thereof. When digital content is selected, the processor 510 may pass information. The content and PSI/SI may be passed among functions within the personal communication device using the bus 504.

The techniques provided by the embodiments herein may be implemented on an integrated circuit chip (not shown).

The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
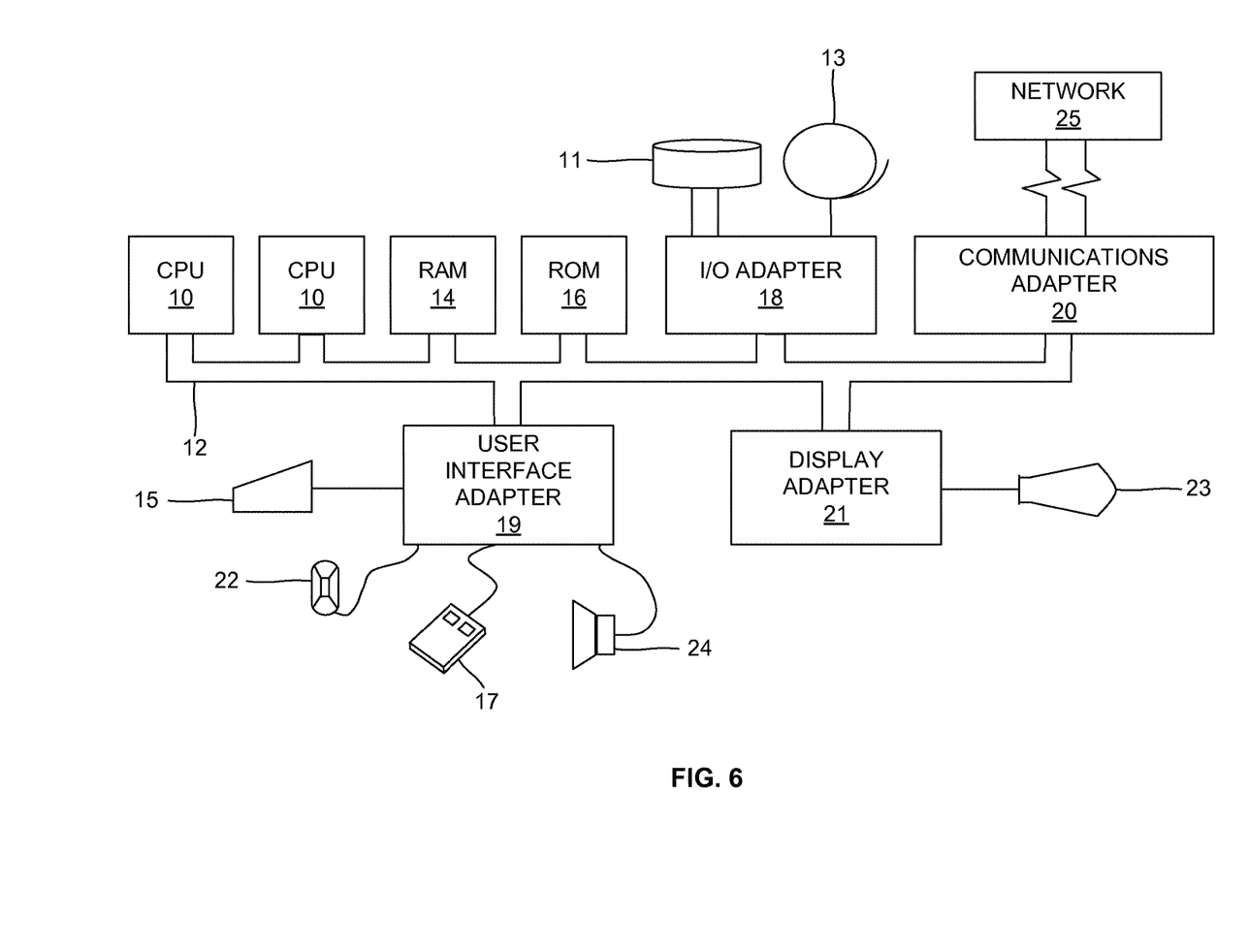
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The test automation tool 106 helps in testing software applications across different browsers and platforms with rapid automation and no maintenance of scripts. The test automation tool 106 suited for complex web applications as well. The test cases and the test actions may be defined in the spreadsheet that facilitates the user 102 to test the software application. The test automation tool 106 significantly reduces cost and time, for software application testing, for the user 102 or through the automated test case scheduling. The automated testing tool 106 offers a very low cost implementation for testing of the software application. The person, who may not have the knowledge of writing a code in a programming language, may be able to test the software application in an automated approach.

The test automation tool 106 is browser and operating system independent. Test case management tool and test scripts management tool are not required due to simple spreadsheet based architecture. The test cases are written based on the one or more keywords. The comprehensive and fast test coverage is possible as testers focus on the time without worrying of test execution on multiple browsers, and operating system. Even during maintenance, tester or even developer needs to change only spreadsheets and automation is done hence maintaining software applications is very easy and fast. The test cycles can be of very short duration which saves huge cost.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for testing a software application comprising:
   (a) a memory unit comprising a database and a set of modules, wherein said database comprises:
      (i) a first set of data associated with a first interface view of an electronic document, comprising:
         (a) a test case data that comprises a plurality of words, (b) a reproduced test steps data, (c) an executing option data, (d) an expected output data, (e) an actual result data, and (f) a status data; and
      (ii) a second set of data associated with a second interface view of said electronic document, comprising:
         (a) a unique step number data, (b) a test steps data, (c) a locator data, and (d) a locator value data;
   (b) a processor that executes said set of modules, wherein said set of modules comprise:
      (i) a test case module, executed by said processor, that extracts a plurality of test case data from said first user interface view of an electronic document to define test cases that are written in a human language and are executed to test said software application, wherein said human language is not a programming language;
      (ii) a test action module, executed by said processor, that processes a test action comprising (a) keywords in said second user interface view of said electronic document to define at least one test action, wherein said keywords are associated with said at least one test action, wherein said test action comprises a plurality of words (b) unique identification number for each of said at least one test actions, wherein each of said test cases is associated with said at least one test action, wherein a reproduced test steps data is fetched based on said unique identification number in said second user interface view of said electronic document and (c) locator, wherein said locator is provided in a locator column of said second interface view of said electronic document, wherein said locator locates and matches elements of a page in said software application that interact with each other, wherein said test action is reproducible for said test cases which found in said test action to reproduce, in said reproduced test steps column in the test cases in said electronic document;
      (iii) a test case execution module, executed by said processor, that executes said test case by executing said at least one test action item to obtain a test case execution result, wherein said test case execution result is provided in said electronic document;
      (iv) a result obtaining module, executed by said processor, that obtains a result associated with an input received at said first user interface view of said electronic document, wherein said result for said test case specifies an actual result obtained on application under test, wherein said input comprises a plurality of words;
      (v) a comparison module, executed by said processor, that compares said obtained test case execution result with a predetermined result associated with said input received at said first user interface view of said electronic document;
      (vi) a validation module, executed by said processor, that validates said software application based on said comparison; and
      (vii) a result notification module, executed by said processor, that notifies said test case execution result to said user, wherein said test case execution result comprises at least one of (i) pass, (ii) fail, (iii) skip, or (iv) block, wherein said result notification module notifies said test case execution result as (a) PASS when a match is determined between said predetermined result and said test case execution result, or (b) FAIL when a last test action in said test case indicates an error, or (c) SKIP when it is written as NO in an execute column for said test case, or (d) BLOCK when any of said at least one test actions in said test case other than said last test action indicate an error.

2. The system of claim 1, further comprises, a locator module, executed by said processor that searches and matches said at least one test action that corresponds to said test case.

3. The system of claim 2, wherein said locator module searches and matches said at least one test action that corresponds to said test case is based on at least one of (i) identifier, (ii) name, (iii) class name, (iv) CSS selector, (v) link text, (vi) partial link text, (vii) tag name.

4. The system of claim 1, further comprises, a test action fetch module, executed by said processor, that fetches at least one test action item that corresponds to said test case from said second user interface.

5. The system of claim 1, further comprises an error summary data associated with said first interface view of an electronic document.

6. The system of claim 1, further comprises a browser data and a test data associated with said second interface view of said electronic document.

7. A processor implemented method for testing a software application, wherein said processor implemented method comprising:
   (i) extracting, a plurality of test case data from a first user interface view of an electronic document to define test cases that are written in a human language and are executed to test said software application, wherein said human language is not a programming language;
   (ii) processing, a test action comprising (a) keywords in a second user interface view of said electronic document to define at least one test action, wherein said keywords are associated with said at least one test action, wherein said test action comprises a plurality of words (b) unique identification number for each of said at least one test actions, wherein each of said test cases is associated with at least one said test action, wherein a reproduced test steps data is fetched based on said unique identification number in said second user interface view of said electronic document and (c) locator, wherein said locator is provided in a locator column of said second interface view of said second electronic document, wherein said locator locates and matches elements of a page in said software application that need to interact with each other, wherein said test action is reproducible for said test cases which found in said test action to reproduce, in said reproduced test steps column in the test cases in said electronic document;

(iii) executing said test case by executing said at least one test action item to obtain a test case execution result, wherein said test case execution result is provided in said electronic document;

(iv) obtaining a result associated with an input received at said first user interface view of said electronic document, wherein said result for said test case specifies an actual result obtained on application under test, wherein said input comprises a plurality of words;

(v) comparing said obtained test case execution result with a predetermined result associated with said input received at said first user interface view of said electronic document;

(vi) validating, said software application based on said comparison; and (vii) notifying, said test case execution result to said user, wherein said test case execution result comprises at least one of (i) pass, (ii) fail, (iii) skip, or (iv) block, wherein said result notification module notifies said test case execution result as (a) PASS when a match is determined between said predetermined result and said test case execution result, or (b) FAIL when a last test action in said test case indicates an error, or (c) SKIP when it is written as NO in an execute column for said test case, or (d) BLOCK when any of said at least one test actions in said test case other than said last test action indicate an error.

8. The processor implemented method of claim 7, further comprises, searching and matching, by a locator unit, said at least one test action that corresponds to said test case.

9. The processor implemented method of claim 8, wherein searching and matching said at least one test action that corresponds to said test case is based on at least one of (i) identifier, (ii) name, (iii) class name, (iv) CSS selector, (v) link text, (vi) partial link text, (vii) tag name.

10. The processor implemented method of claim 7, further comprises, fetching at least one test action item that corresponds to said test case from said second user interface.

11. One or more non-transitory computer readable storage mediums storing one or more sequences of instructions, which when executed by one or more processors, causes extracting, a plurality of test case data from a first user interface view of an electronic document to define test cases that are written in a human language and are executed to test said software application, wherein said human language is not a programming language;

processing, a test action comprising (i) keywords in a second user interface view of said electronic document to define at least one test action, wherein said keywords are associated with said at least one test action, wherein said test action comprises a plurality of words (ii) unique identification number for each of said at least one test actions, wherein each of said test cases is associated with at least one said test action, wherein a reproduced test steps data is fetched based on said unique identification number in said second user interface view of said electronic document and (iii) locator, wherein said locator is provided in a locator column of said second interface view of said second electronic document, wherein said locator locates and matches elements of a page in said software application that need to interact with each other, wherein said test action is reproducible for said test cases which found in said test action to reproduce, in said reproduced test steps column in the test cases in said electronic document;

fetching, at least one test action item that corresponds to said test case from said second user interface;

executing said test case by executing said at least one test action item to obtain a test case execution result, wherein said test case execution result is provided in said electronic document;

obtaining a result associated with an input received at said first user interface view of said electronic document, wherein said result for said test case specifies an actual result obtained on application under test, wherein said input comprises a plurality of words;

comparing said obtained test case execution result with a predetermined result associated with said input received at said first user interface view of said electronic document;

validating, said software application based on execution of said test case; and notifying, said test case execution result to said user, wherein said test case execution result comprises at least one of (i) pass, (ii) fail, (iii) skip, or (iv) block, wherein said result notification module notifies said test case execution result as (a) PASS when a match is determined between said predetermined result and said test case execution result, or (b) FAIL when a last test action in said test case indicates an error, or (c) SKIP when it is written as NO in an execute column for said test case, or (d) BLOCK when any of said at least one test actions in said test case other than said last test action indicate an error.

12. The one or more non-transitory computer readable storage mediums of claim 11, further comprises, searching and matching, by a locator unit, said at least one test action that corresponds to said test case.

13. The one or more non-transitory computer readable storage mediums of claim 12, wherein searching and matching said at least one test action that corresponds to said test case is based on at least one of (i) identifier, (ii) name, (iii) class name, (iv) CSS selector, (v) link text, (vi) partial link text, (vii) tag name.

* * * * *